(12) United States Patent
Ishioka et al.

(10) Patent No.: US 7,572,746 B2
(45) Date of Patent: Aug. 11, 2009

(54) OPTICAL GLASS

(75) Inventors: Junko Ishioka, Sagamihara (JP); Masahiro Onozawa, Sagamihara (JP)

(73) Assignee: Kabushiki Kaisha Ohara, Kanagawa-Ken (JP)

( * ) Notice: Subject to any disclaimer, the term of this patent is extended or adjusted under 35 U.S.C. 154(b) by 497 days.

(21) Appl. No.: 10/925,017

(22) Filed: Aug. 24, 2004

(65) Prior Publication Data
US 2005/0054514 A1 Mar. 10, 2005

(30) Foreign Application Priority Data
Sep. 9, 2003 (JP) ............................. 2003-316915

(51) Int. Cl.
*C03C 3/078* (2006.01)
(52) U.S. Cl. ...................... 501/72; 501/65; 501/66; 501/67
(58) Field of Classification Search ............... 501/72, 501/65, 66, 67, 69, 70, 57, 58, 59
See application file for complete search history.

(56) References Cited

U.S. PATENT DOCUMENTS

| | | | | |
|---|---|---|---|---|
| 4,177,319 A | * | 12/1979 | Jahn .......................... 428/410 |
| 5,320,985 A | * | 6/1994 | Enomoto ..................... 501/57 |
| 5,422,755 A | * | 6/1995 | Morgan ....................... 359/361 |
| 5,434,111 A | * | 7/1995 | Clement et al. .............. 501/63 |
| 6,825,142 B2 | * | 11/2004 | Pucilowski et al. .......... 501/64 |
| 2002/0010065 A1 | * | 1/2002 | Masumura et al. ........... 501/57 |

FOREIGN PATENT DOCUMENTS

| | | | |
|---|---|---|---|
| EP | 1162180 A1 | * | 12/2001 |
| EP | 1 288 170 | | 3/2003 |
| GB | 1 353 935 | | 5/1974 |
| GB | 2 115 403 | | 9/1983 |
| GB | 2 320 023 | | 6/1998 |
| JP | 06-092677 | | 4/1994 |
| WO | WO 98/50315 | | 11/1998 |
| WO | WO 02 059053 A1 | * | 8/2002 |

* cited by examiner

*Primary Examiner*—Karl E Group
*Assistant Examiner*—Elizabeth A Bolden
(74) *Attorney, Agent, or Firm*—James V. Costigan; Hedman & Costigan, P.C.

(57) ABSTRACT

An optical glass having optical constants of refractive index (nd) within a range from 1.49 to 1.54 and Abbe number (ν d) within a range from 55 to 65 comprises, in mass %,

| | |
|---|---|
| $SiO_2$ | >65-75% |
| $R_2O$ (R is at least one selected from the group consisting of Li, Na, K and Cs) | 15-25% |
| where $Li_2O$ | 0.1-5.0% |
| $Na_2O$ | 1.0-10.0% |
| $K_2O$ | 5.0-20.0% and |
| $Cs_2O$ | 0-5.0% |
| R'O (R' is at least one selected from the group consisting of Mg, Ca, Sr or Ba) | 0.5-10% |
| where MgO | 0-10% and/or |
| CaO | 0-10% and/or |
| SrO | 0-10% and/or |
| BaO | 0-10% |
| ZnO | 0-<3.0% and/or |
| $B_2O_3$ | 0-6.0% and/or |
| $Al_2O_3$ | 0-<1.0% and/or |
| $TiO_2$ | 0-<2.0% and/or |
| $ZrO_2$ | 0-2% and/or |
| $WO_3$ | 0-3.0% and/or |
| $Sb_2O_3$ | 0-2.0% and |
| a fluoride or fluorides of a metal element or elements contained in the above metal oxides, a total amount of F contained in the fluoride or fluorides | 0-2%. |

3 Claims, No Drawings

OPTICAL GLASS

TECHNICAL FIELD

This invention relates to a $SiO_2$—$R_2O$—RO optical glass having optical constants of refractive index (nd) within a range from 1.49 to 1.54 and Abbe number (v d) within a range from 55 to 65 used for various optical parts such as interchangeable lenses. More particularly, the invention relates to an optical glass which can be applied to optical parts without performing an ion exchange processing (for forming refractive index distribution or chemical strengthening) or a surface changing processing (excluding coating of the glass with a functional coating such as an anti-reflection coating).

BACKGROUND OF THE INVENTION

It has been a recent tendency to remove environment polluting materials from products for protecting the global environment. In the field of optical glasses, optical glasses including components such as PbO and $As_2O_3$ which impose a heavy burden to the environment were used and produced in the past but these optical glasses have gradually been replaced by optical glasses which are free of such environment contaminating components. There are, however, still optical glasses which contain environmental contaminating components and further reduction of burden to the environment is desired for.

As $SiO_2$—$R_2O$—RO optical glasses having optical constants of refractive index within a range from 1.49 to 1.54 and Abbe number (v d) within a range from 55 to 65, known in the art are optical glasses designed for sealing a stainless lens holder as disclosed in Japanese Patent Application Laid-open Publication No. Hei 3-183638, optical glasses designed for a lens fixed to a stainless holder as disclosed in Japanese Patent Application Laid-open Publication No. Hei 4-224132, optical glasses which are free of solarization as disclosed in Japanese Patent Application Laid-open Publication No. Hei 8-34633 and Pb-free crown glasses as disclosed in Japanese Patent Application Laid-open Publication No. Hei 10-167753.

Glasses containing a large amount of $Al_2O_3$ such as those disclosed in Japanese Patent Application Laid-open Publication No. Hei 3-183638 and Japanese Patent Application Laid-open Publication No. Hei 4-224132 have excellent chemical durability but poor defoaming property and require melting of raw materials at high temperature with resulting increase in the energy consumption and decrease in the productivity which is quite undesirable. Further, excessive pursuit for improving chemical durability tends to result in deterioration in processability such as polishing with resulting increase in the manufacturing cost.

The above-described Japanese Patent Application Laid-open Publication No. Hei 8-34633 discloses optical glasses which contains SnO and $SnO_2$ as essential components for prevention of solarization. The use of SnO and $SnO_2$, however often has the problem of affecting the melting equipment adversely because these components are alloyed with a platinum part of the melting equipment during melting of the glass with the result that leakage of glass takes place.

The Pb-free crown glasses disclosed in Japanese Patent Application Laid-open Publication No. Hei 10-167753 are free of PbO and $As_2O_3$ but contain ZnO as an essential component. The ZnO component dissolves in the form of a Zn ion into water through sludge which is produced as a result of grinding and polishing of the glass. If water containing the Zn ion is drained without being subjected to a proper treatment, it will cause water pollution and, therefore, much care must be taken in waste water treatment. From the standpoint of the environmental protection and reduction of the manufacturing cost, an optical glass which is free of an environment contaminating material to the maximum extent possible is required.

Japanese Patent Application Laid-open Publication No. Hei 9-255253 discloses Pb-free crown glasses for spectacles which are free of PbO and $As_2O_3$. These glasses, however contain a large amount of $TiO_2$ and $Nb_2O_5$ and, for this reason, it is difficult to realize a desired v d by these glasses.

Japanese Patent Application Laid-open Publication No. Sho 48-85613 discloses glasses for spectacles which are free of PbO and $As_2O_3$ but these glasses require chemical strengthening indispensably and contain a large amount of $Al_2O_3$. These glasses therefore have the same disadvantages as the above described glasses of Japanese Patent Application Laid-open Publication No. Hei 3-183638 and Japanese Patent Application Laid-open Publication No. Hei 4-224132.

In a hot forming such as reheat pressing, pressing of glass to a desired form at a lower temperature contributes to saving of energy and, therefore, a lower softening temperature of glass contributes to reduction of burden to the environment. Since a glass which contains a large amount of $SiO_2$ generally has a relatively high softening temperature, it necessarily requires reheat pressing at a relatively high temperature.

It is, therefore, an object of the present invention to provide a $SiO_2$—$R_2O$—RO optical glass having optical constants of a refractive index (nd) within a range from 1.49 to 1.54 and Abbe number (v d) within a range from 55 to 65 with reduced burden to the environment and at a reduced manufacturing cost.

SUMMARY OF THE INVENTION

Studies and experiments made by the inventors of the present invention for achieving the above described object of the present invention have resulted in the finding, which has led to the present invention, that, in a $SiO_2$—$R_2O$—RO optical glass of a specific composition, a desired optical glass having desired optical constants can be provided without using the environment polluting materials such as PbO and $As_2O_3$ and at a reduced manufacturing cost in respect of glass raw materials, melting of the glass raw materials and processing of the glass.

For achieving the object of the present invention, there is provided an optical glass having optical constants of refractive index (nd) within a range from 1.49 to 1.54 and Abbe number (v d) within a range from 55 to 65 and comprising, in mass %,

| | |
|---|---|
| $SiO_2$ | >65-75% |
| $R_2O$ (R is at least one selected from the group consisting of Li, Na, K and Cs) | 15-25% |
| where $Li_2O$ | 0.1-5.0% |
| $Na_2O$ | 1.0-10.0% |
| $K_2O$ | 5.0-20.0% and |
| $Cs_2O$ | 0-5.0% |
| R'O (R' is at least one selected from the group consisting of Mg, Ca, Sr or Ba) | 0.5-10% |
| where MgO | 0-10% and/or |
| CaO | 0-10% and/or |
| SrO | 0-10% and/or |
| BaO | 0-10% |
| ZnO | 0-<3.0% and/or |
| $B_2O_3$ | 0-6.0% and/or |
| $Al_2O_3$ | 0-<1.0% and/or |

-continued

| | |
|---|---|
| TiO$_2$ | 0-<2.0% and/or |
| ZrO$_2$ | 0-2% and/or |
| WO$_3$ | 0-3.0% and/or |
| Sb$_2$O$_3$ | 0-2.0% and |
| a fluoride or fluorides of a metal element or elements contained in the above metal oxides, a total amount of F contained in the fluoride or fluorides | 0-2%. |

In one aspect of the invention, there is provided an optical glass having optical constants of refractive index (nd) within a range from 1.50 to 1.53 and Abbe number (v d) within a range from 57 to 62 and comprising, in mass %,

| | |
|---|---|
| SiO$_2$ | 67-72% |
| B$_2$O$_3$ | 0-6.0% |
| Al$_2$O$_3$ | 0-<1.0% |
| R$_2$O (R is at least one selected from the group consisting of Li, Na, K and Cs) | 20-25% |
| where Li$_2$O | 0.1-5.0% |
| Na$_2$O | 1.0-10.0% |
| K$_2$O | 10.0-20.0% and |
| Cs$_2$O | 0-5.0% |
| R'O (R' is at least one selected from the group consisting of Mg, Ca, Sr and Ba) | 0.5-5.0% |
| where MgO | 0-5.0% and/or |
| CaO | 0-5.0% and/or |
| SrO | 0-5.0% and/or |
| BaO | 0-5.0% |
| TiO$_2$ | 0-<2.0% and/or |
| ZrO$_2$ | 0-2.0% and/or |
| WO$_3$ | 0-3.0% and/or |
| Sb$_2$O$_3$ | 0-2.0%. |

In another aspect of the invention there is provided an optical glass as described above which is free of ZnO, PbO and As$_2$O$_3$.

According to the invention, an optical glass having optical constants of refractive index (nd) within a range from 1.49 to 1.54 and Abbe number (v d) within a range from 55 to 65 can be produced with reduced burden to the environment and at a reduced manufacturing cost. Further, according to the invention, since the glass transition point (Tg) is low, reheat pressing at a relatively low temperature can be realized and this glass is also suitable for a glass for mold pressing, namely precision pressing of a glass which does not require grinding or polishing after press forming but can be used directly as an optical element such as a lens.

DETAILED DESCRIPTION OF THE INVENTION

Reasons for restricting composition ranges of respective components of the optical glasses of the present invention will be described below. Amounts of the respective components are expressed in mass %.

SiO$_2$ is an indispensable oxide for forming the glass. If the amount of this component is 65% or below, chemical durability of the glass becomes insufficient and desired optical constants cannot be obtained. If the amount of this component exceeds 75%, melting property of the glass is deteriorated with the result that a large amount of energy is consumed for melting of the glass. Therefore, the amount of this component should be larger than 65%, preferably be 66% or over, and most preferably be 67% or over. The amount of this component should be 75% or below, preferably be 73% or below, and most preferably be 72% or below.

B$_2$O$_3$ is effective for improving melting property and stability of the glass and may be added if necessary. If the amount of this component exceeds 6%, chemical durability of the glass is deteriorated and the glass tends to become colored. Besides, the glass tends to become opaque when it is reheated due to occurrence of phase separation and devitrification. The amount of this component, therefore, should be 6.0% or below, preferably 5.8% or below, and most preferably, be 5.7% or below.

Addition of Al$_2$O$_3$ at a small amount is effective for improving chemical durability of the glass. Since, however, addition of an excessive amount of this component necessitates melting of the glass at a high temperature, the amount of this component should be less than 1%, preferably 0.8% or below and, most preferably, be 0.6% or below.

Li$_2$O is an essential component in the glass of the present invention because addition of a small amount of this component is effective for improving melting property of the glass and lowering softening temperature of the glass and thereby reducing the manufacturing cost for melting of the glass and reheat pressing of the glass. If the amount of this component is less than 0.1%, these effects cannot be achieved sufficiently whereas if the amount of this component exceeds 5%, desired optical constants cannot be obtained and, moreover, chemical durability is significantly deteriorated. Accordingly, the amount of this component should be 0.1% or over, preferably 0.2% or over and, most preferably, be 0.4% or over and should be 5% or below, preferably 4.5% or below and, most preferably, be 4% or below.

Na$_2$O is an essential component which is effective for improving melting property of the glass and adjusting optical constants. If the amount of this component is less than 1.0%, these effects cannot be achieved sufficiently whereas if the amount of this component exceeds 10%, chemical durability of the glass tends to be significantly deteriorated. Accordingly, the amount of this component should be 1.0% or over, preferably 1.5% or over and, most preferably, be 2% or over and should be 10% or below, preferably 9.5% or below and, most preferably, be 9% or below.

K$_2$O has effects similar to those of Na$_2$O and is an essential component. If the amount of this component is less than 5%, these effects cannot be achieved sufficiently whereas if the amount of this component exceeds 20%, resistance to devitrification and chemical durability of the glass are deteriorated. For lowering viscosity of the glass during melting while maintaining desired optical constants, the amount of this component should be 5% or over, more preferably 10% or over and, most preferably, be 12% or over and should be 20% or below, preferably 19% or below and, most preferably, be 18% or below.

Cs$_2$O has equivalent effects to the above described alkali metal oxides and may be added optionally. Since, however, this component is relatively expensive, the amount of this component should be 5% or below, preferably 4% or below and, most preferably be 3% or below for manufacturing the glass at a reduced cost.

By having plural alkali metal oxides coexist, chemical durability can be improved by the mixed alkali effect and, therefore, the total amount of the alkali metal oxides should be 15% or over, more preferably 20% or over and, most preferably be 21% or over and should be 25% or below, preferably 24.5% or below and, most preferably be 24% or below. If the total amount of R$_2$O is less than 15%, the effect of improving melting property of the glass cannot be achieved sufficiently and melting of the glass at a high temperature is required with resulting increase in the energy consumption and deterioration in productivity. If the total amount of R$_2$O exceeds 25%, the content of the $SiO_2$ component is lowered relatively and, therefore, chemical durability of the glass is deteriorated.

Alkaline earth metal oxides (R'O), i.e., MgO, CaO, SrO and BaO, can adjust optical constants, i.e., refractive index (nd) and Abbe number (ν d), and may be added optionally in an amount not exceeding 10% respectively. For realizing a glass having refractive index (nd) within a range from 1.50 to 1.53, the respective R'O components should preferably be added in an amount not exceeding 5%. Further, since addition of a proper amount of the R'O component to the $SiO_2$—$R_2O$ glass is effective for prevention of migration and/or diffusion of alkali metal ions in the glass and thereby improving chemical durability of the glass, the total amount of the R'O components should be not less than 0.5%. If the total amount of the R'O components exceeds 10%, refractive index increases excessively and desired optical constants cannot be achieved. Accordingly, the total amount of the R'O components should be 0.5% or over, preferably 0.8% or over and, most preferably, be 1% or over and should be 10% or below, preferably 7% or below and, most preferably, be 5% or below.

ZnO is effective for lowering viscosity of the glass during melting and thereby improving melting property of the glass and also is effective for lowering softening temperature of the glass and, therefore, may be added optionally in an amount of less than 3.0%. Addition of this component in an amount exceeding this amount is not desirable since desired optical constants cannot be achieved. For eliminating the danger of the ZnO component dissolving in the drainage and thereby causing water pollution, a preferable upper limit of this component is 2% and, most preferably, this component should not be added at all except for inevitable mixing of this component in the raw materials.

$TiO_2$ is useful for preventing solarization and adjusting optical constants and may be added optionally in an amount of less than 2.0%. Addition of this component in an amount exceeding this amount is not desirable since desired optical constants cannot be achieved. Accordingly, the amount of this component should be less than 2.0%, more preferably 1.9% or below and, most preferably be 1.8% or below.

$ZrO_2$ is effective for adjusting optical constants and improving chemical durability and may be added optionally in an amount up to 2.0%. Addition of this component in an amount exceeding this amount is not desirable since melting property of the glass is deteriorated. Accordingly, the amount of this component should be 2.0% or below, more preferably 1.5% or below and, most preferably be 1% or below.

$WO_3$ is effective for improving melting property of the glass and adjusting optical constants of the glass and may be added optionally in an amount up to 3.0%. Addition of this component in an amount exceeding this amount is not desirable since the glass is colored significantly. Accordingly, the amount of this component should be 3.0% or below, more preferably 2.5% or below and, most preferably be 2% or below.

$Sb_2O_3$ which is known as a defoaming agent is effective for refining and defoaming the glass and may be added optionally in an amount up to 2.0%. Addition of this component in an amount exceeding this amount is not necessary because it does not contribute to refining and defoaming of the glass. Accordingly, the amount of this component should be 2.0% or below, more preferably 1.5% or below and, most preferably be 1% or below.

F is effective for lowering viscosity of the glass and also has defoaming effect and, therefore, fluoride or fluorides of a metal element or elements contained in the above metal oxides may be added optionally in a total amount of F contained in the fluoride o fluorides up to 2.0%. Addition of the F component, however, has the danger of the F component evaporating during melting of the glass and thereby causing pollution of the air. Accordingly, in the present invention, the amount of this component should be 2.0% or below, more preferably 1% or below and, most preferably, this component should not be added at all except for inevitable mixing of this component in the raw materials.

Further, in the present invention, the upper limit of the amount of Pb and/or PbO and $As_2O_3$ should be 0.01%, more preferably 0.005% and, most preferably, the glass should be completely free of these components except for inevitable mixing of this component in the raw materials.

The upper limit of the amount of $SnO_2$ and SnO should be 0.01%, more preferably 0.005% and, most preferably, the glass should be completely free of these components.

If even a small amount of transition metal elements such as V, Cr, Mn, Fe, Co, Ni, Cu, Ag and Mo except for Ti is added, singly or in combination, the glass is colored and absorption of a specific wavelength in the visible region is thereby caused. Therefore, these components should preferably not be substantially contained in an optical glass which uses a wavelength in the visible region. Also, if rare earth components except for La and Gd are added, singly or in combination, the glass sometimes is colored and absorption of a specific wavelength in the visible region is thereby caused. Therefore, these rare earth components except for La and Gd should preferably not be substantially contained in an optical glass which uses a wavelength in the visible region.

Further, there is tendency that use of Pb, Th, Cd, Ti, As, Os, Te, Be, Se and Bi is refrained as harmful chemical substance. For using these elements, steps must be taken for the environmental protection not only in manufacturing of the glass but also in processing of the glass and treatment of glass products. From the standpoint of attaching importance to the environment, the glass should preferably be substantially free of these components.

EXAMPLES

Examples of the present invention will now be described.

Tables 1 and 2 show compositions of Examples No. 1 to 10 which are suitable for obtaining optical glasses having refractive index (nd) within a range from 1.49 to 1.54 and Abbe number (ν d) within a range from 55 to 65, refractive index (nd) and Abbe number (ν d) of the glasses obtained, wavelength (T80%) exhibiting 80% transmittance in a glass plate having thickness of 10 mm and results of a defoaming test for measuring defoaming occurring during melting of the glass. Table 3 shows Comparative Examples A to C of known optical glasses. The Comparative Examples A and B show Example Nos.; 1 and 3 of the above described Japanese Patent Application Laid-open Publication No. Hei 10-167753 and Comparative Example C shows Example No. 6 of the above described Japanese Patent Application Laid-open Publication No. Hei 4-224132. In these Tables, figures of the compositions represent mass % of the respective components to the total mass of the glass.

TABLE 1

|  | 1 | 2 | 3 | 4 | 5 | 6 |
|---|---|---|---|---|---|---|
| $SiO_2$ | 69.97 | 67.72 | 70.50 | 71.50 | 70.50 | 67.00 |
| $B_2O_3$ | 1.60 | 5.75 | 2.40 | 2.40 | 3.00 | 4.50 |

TABLE 1-continued

|  | 1 | 2 | 3 | 4 | 5 | 6 |
|---|---|---|---|---|---|---|
| $Al_2O_3$ |  |  | 0.30 | 0.30 | 0.30 |  |
| $Li_2O$ | 1.00 | 1.00 | 1.20 | 1.30 | 0.50 | 1.00 |
| $Na_2O$ | 6.20 | 3.10 | 9.00 | 9.00 | 8.30 | 3.10 |
| $K_2O$ | 15.30 | 17.50 | 13.50 | 13.60 | 12.60 | 17.50 |
| $\Sigma R_2O$ | 22.50 | 21.60 | 23.70 | 23.90 | 21.40 | 21.60 |
| MgO |  |  |  |  |  |  |
| CaO | 4.69 | 2.99 | 2.50 | 1.50 |  | 2.99 |
| SrO |  |  |  |  |  |  |
| BaO |  |  |  |  | 3.10 | 2.00 |
| $\Sigma R'O$ | 4.69 | 2.99 | 2.50 | 1.50 | 3.10 | 4.99 |
| ZnO |  |  |  |  |  |  |
| $TiO_2$ | 1.00 | 1.69 | 0.10 |  |  | 1.50 |
| $ZrO_2$ |  |  |  |  |  | 0.20 |
| $WO_3$ |  |  |  |  | 1.30 |  |
| $Sb_2O_3$ | 0.20 | 0.20 | 0.50 | 0.40 | 0.40 | 0.20 |
| Total | 100 | 100 | 100 | 100 | 100 | 100 |
| nd | 1.518 | 1.552 | 1.511 | 1.508 | 1.502 | 1.525 |
| νd | 59.0 | 59.8 | 60.5 | 60.7 | 59.0 | 58.8 |
| T80(nm) | 350 | 350 | 330 | 320 | 340 | 350 |
| Defoaming test | ○ | ○ | ○ | ○ | ○ | ○ |

TABLE 2

|  | 7 | 8 | 9 | 10 |
|---|---|---|---|---|
| $SiO_2$ | 71.50 | 68.00 | 68.50 | 69.50 |
| $B_2O_3$ | 2.40 | 4.00 | 5.70 | 2.40 |
| $Al_2O_3$ | 0.30 |  | 0.30 | 0.30 |
| $Li_2O$ | 1.30 | 0.50 | 0.50 | 1.20 |
| $Na_2O$ | 9.00 | 7.80 | 7.80 | 9.00 |
| $K_2O$ | 13.60 | 15.20 | 15.20 | 13.60 |
| $\Sigma R_2O$ | 23.90 | 23.50 | 23.50 | 23.80 |
| MgO | 1.50 |  |  |  |
| CaO |  | 1.50 | 1.50 | 3.50 |
| SrO |  | 1.20 |  |  |
| BaO |  |  |  |  |
| $\Sigma R'O$ | 1.50 | 2.70 | 1.50 | 3.50 |
| ZnO |  | 1.00 |  |  |
| $TiO_2$ |  | 0.30 |  |  |
| $ZrO_2$ |  |  |  |  |
| $WO_3$ |  |  |  |  |
| $Sb_2O_3$ | 0.40 | 0.50 | 0.50 | 0.50 |
| Total | 100 | 100 | 100 | 100 |
| nd | 1.505 | 1.513 | 1.511 | 1.514 |
| νd | 61.0 | 61.8 | 62.2 | 60.5 |
| T80(nm) | 320 | 330 | 320 | 320 |
| Defoaming test | ○ | ○ | ○ | ○ |

TABLE 3

|  | A | B | C |
|---|---|---|---|
| $SiO_2$ | 67.89 | 66.26 | 65.70 |
| $B_2O_3$ | 3.21 | 3.73 | 1.50 |
| $Al_2O_3$ |  |  | 3.50 |
| $Li_2O$ |  |  | 0.50 |
| $Na_2O$ | 6.96 | 6.17 | 3.80 |
| $K_2O$ | 16.08 | 12.87 | 17.00 |
| CaO |  | 2.49 | 7.20 |
| SrO |  |  | 0.80 |
| ZnO | 5.45 | 8.16 |  |
| $TiO_2$ | 0.32 | 0.32 |  |
| $ZrO_2$ | 0.10 |  |  |
| SnO |  |  |  |
| $Sb_2O_3$ |  |  |  |
| nd | 1.5115 | 1.5213 | 1.5180 |
| νd | 59.43 | 59.16 | 61.00 |
| T80(nm) | 340 | 340 | 340 |
| Defoaming test | Δ | Δ | X |

Description will now be made about details of the defoaming test in melting the glass. Glass raw materials of 300 g which have been prepared to constitute a predetermined composition were put in a platinum crucible and placed in an electric furnace operating at the temperature of 1400° C. for vitrification. The crucible was taken out of the electric furnace one hour later and the melt was stirred with a platinum bar. The melt was then held again in the electric furnace under the temperature of 1400° C. for two hours and then the temperature of the electric furnace was lowered to 1300° C. and the melt was held further in this electric furnace for one hour. Then, the glass was cast into a mold and annealed. A glass sample obtained was polished in opposite surfaces to a thickness of 10 mm and the number of bubbles contained in the glass sample was measured. A glass sample in which the number of bubbles was less than 20/cm³ was marked ○, a glass sample in which the number of bubbles/cm³ was 20 or more and less than 50 was marked Δ, and a glass sample in which the number of bubbles/cm³ was more than 50 was marked X in Tables 1 to 3.

For manufacturing the glasses of the examples of Tables 1 and 2, ordinary raw materials for an optical glass such as oxides, carbonates, nitrates, fluorides and hydroxides were weighed and mixed at a predetermined ratio and the mixed materials were put in a platinum crucible and melted at a temperature within a range from 1300° C. to 1450° C. for three to four hours depending upon melting property of the glass composition. The melt was stirred and thereby homogenized and then, after the temperature was lowered to a proper temperature, the melt was cast into a mold and annealed to provide the glasses.

From Tables 1 and 2, it will be apparent that the glasses of the examples shown in these tables have excellent defoaming property during the melting process without containing the environment polluting materials such as PbO and $As_2O_3$ while realizing desired optical constants. On the other hand, the glasses of the Comparative Examples A and B shown in Table 3, in which the mark of the defoaming test is Δ, are likely to consume a large amount of energy during the melting process and, in addition, since these glasses contain ZnO component at a relatively high concentration, care must be taken for treating waste water from waste material left after processing of the glass and also from the processing equipment. The glass of Comparative Example C has high viscosity during melting and has poor defoaming property and, therefore, melting of the glass at a higher temperature is necessary with the result that increase in the energy consumption is inevitable.

The above described examples of the invention are listed for illustrative purpose only and the present invention is not limited to these examples. Various modifications will be made by those skilled in the art without departing from the spirit and scope of the present invention.

What is claimed is:

1. An optical glass having optical constants of refractive index (nd) within a range from 1.49 to 1.54 and Abbe number (ν d) within a range from 55 to 65 and comprising, in mass %,

| | |
|---|---|
| $SiO_2$ | >65-75% |
| $R_2O$ (R is at least one selected from the group consisting of Li, Na, K and Cs) | 15-25% |
| where $Li_2O$ | 0.1-5.0% |
| $Na_2O$ | 1.0-10.0% |
| $K_2O$ | 12.6-20.0% and |
| $Cs_2O$ | 0-5.0% |
| R'O (R' is at least one selected from the group consisting of Mg, Ca, Sr and Ba) | 0.5-10% |
| where MgO | 0-10% and/or |

-continued

| | |
|---|---|
| CaO | 0-10% and/or |
| SrO | 0-10% and/or |
| BaO | 0-10% |
| $B_2O_3$ | 0-6.0% and/or |
| $Al_2O_3$ | 0-<1.0% and/or |
| $TiO_2$ | 0-1.69% and/or |
| $ZrO_2$ | 0-2.0% and/or |
| $WO_3$ | 0-3.0% and/or |
| $Sb_2O_3$ | 0-2.0% and | and comprising no ZnO or F except for an impurity mixed by inevitable mixing.

2. An optical glass having optical constants of refractive index (nd) within a range from 1.50 to 1.53 and Abbe number ($\nu$ d) within a range from 57 to 62 and comprising, in mass %,

| | |
|---|---|
| $SiO_2$ | 67-72% |
| $B_2O_3$ | 0-6.0% |
| $Al_2O_3$ | 0-<1.0% |
| $R_2O$ (R is at least one selected from the group consisting of Li, Na, K and Cs) | 20-25% |
| where $Li_2O$ | 0.1-5.0% |
| $Na_2O$ | 1.0-10.0% |
| $K_2O$ | 12.6-20.0% and |
| $Cs_2O$ | 0-5.0% |
| R'O (R' is at least one selected from the group consisting of Mg, Ca, Sr and Ba) | 0.5-5% |
| where MgO | 0-5.0% and/or |
| CaO | 0-5.0% and/or |
| SrO | 0-5.0% and/or |
| BaO | 0-5.0% |
| $TiO_2$ | 0-1.69% and/or |
| $ZrO_2$ | 0-2.0% and/or |
| $WO_3$ | 0-3.0% and/or |
| $Sb_2O_3$ | 0-2.0%. | and comprising no ZnO or F except for an impurity mixed by inevitable mixing.

3. An optical glass as defined in claim 1 or 2 which is free of ZnO, PbO and $As_2O_3$.

* * * * *